(12) United States Patent
Rosen et al.

(10) Patent No.: US 7,925,290 B2
(45) Date of Patent: Apr. 12, 2011

(54) SYSTEM AND METHOD FOR EFFICIENTLY PROVIDING HIGH-PERFORMANCE DISPATCH SERVICES IN A WIRELESS SYSTEM

(75) Inventors: Eric C. Rosen, Solana Beach, CA (US); Francesco Grilli, San Diego, CA (US); Harleen K. Gill, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1314 days.

(21) Appl. No.: 11/097,045

(22) Filed: Mar. 31, 2005

(65) Prior Publication Data
US 2006/0223564 A1 Oct. 5, 2006

(51) Int. Cl.
H04B 7/00 (2006.01)
H04B 1/38 (2006.01)
H04B 7/216 (2006.01)
H04W 40/00 (2009.01)
G08C 17/00 (2006.01)
G08B 5/22 (2006.01)
H04Q 1/30 (2006.01)

(52) U.S. Cl. ........ 455/519; 455/428; 455/509; 455/574; 370/311; 370/335; 340/7.32; 340/7.36

(58) Field of Classification Search ............... 455/509, 455/512, 515, 517, 518, 519, 521, 522, 561, 455/567, 572, 573, 574, 90.2, 67.14, 127.1, 455/343.1, 436, 450, 455, 456.1, 458, 459, 455/452.1, 466, 67.1, 11.1, 67.11, 79, 343.2, 455/416, 422.1, 424, 426.1, 428, 435.1, 452.2; 370/230, 238, 239, 261, 310, 312, 335, 338, 370/342, 395.2, 401, 431, 437, 311, 320, 370/322, 328, 329, 344, 348, 491; 340/7.32, 7.33, 7.36

See application file for complete search history.

(56) References Cited

U.S. PATENT DOCUMENTS

| 6,289,228 B1 * | 9/2001 | Rotstein et al. | 455/574 |
| 6,449,491 B1 | 9/2002 | Dailey | |
| 6,832,094 B2 * | 12/2004 | Butler et al. | 455/458 |

(Continued)

FOREIGN PATENT DOCUMENTS

JP 2002218557 8/2002

(Continued)

OTHER PUBLICATIONS

International Search Report—PCT/US06/011747—International Search Authority, US—Jul. 25, 2007.

(Continued)

Primary Examiner — Andrew Wendell
Assistant Examiner — Paul P Tran
(74) Attorney, Agent, or Firm — Raphael Freiwirth (57) ABSTRACT

A system and method for providing high performance dispatch services for a push-to-talk (PTT) communication over a wireless communication network. When a wireless device is powered up, it registers with a server and then transitions to a paging state instead of an idle state. When the wireless device is ready to transmit PTT communications, it sends a message to the server and transitions to a transmission state when a confirmation is received from the server. Once in the transmission state, the wireless device is ready to transmit the PTT communications to the server.

23 Claims, 9 Drawing Sheets

U.S. PATENT DOCUMENTS

| | | |
|---|---|---|
| 7,330,733 B2 | 2/2008 | Harris et al. |
| 7,415,283 B2 | 8/2008 | Sinnarajah et al. |
| 2002/0191583 A1 | 12/2002 | Harris et al. |
| 2003/0171125 A1* | 9/2003 | Oprescu-Surcobe et al. ... 455/458 |
| 2004/0053619 A1* | 3/2004 | Kim et al. .................... 455/445 |
| 2004/0121791 A1* | 6/2004 | May et al. .................... 455/519 |
| 2004/0224688 A1 | 11/2004 | Fischer |
| 2004/0266468 A1* | 12/2004 | Brown et al. ................. 455/518 |
| 2005/0009547 A1* | 1/2005 | Harris et al. ................. 455/509 |
| 2005/0009548 A1* | 1/2005 | Kelley et al. ................. 455/509 |
| 2005/0032475 A1 | 2/2005 | Mauney et al. |
| 2005/0043024 A1 | 2/2005 | Shiga |
| 2005/0143056 A1* | 6/2005 | Iyer et al. .................... 455/416 |
| 2005/0169223 A1* | 8/2005 | Crocker et al. .............. 370/342 |
| 2006/0084457 A1* | 4/2006 | Laha et al. ................... 455/519 |
| 2007/0042814 A1 | 2/2007 | Kakimoto et al. |

FOREIGN PATENT DOCUMENTS

| | | |
|---|---|---|
| JP | 2002247640 | 8/2002 |
| JP | 2003092780 | 3/2003 |
| JP | 2004336774 | 11/2004 |
| JP | 2005057394 | 3/2005 |
| JP | 2005079660 | 3/2005 |
| JP | 2004533170 | 3/2008 |
| WO | WO03092247 A2 | 11/2003 |
| WO | WO2005006829 A2 | 1/2005 |
| WO | WO2005011296 A2 | 2/2005 |

OTHER PUBLICATIONS

Written Opinion—PCT/US06/011747—International Search Authority, US—Jul. 25, 2007.

International Preliminary Report on Patentability—PCT/US06/011747—IPEA, US—Oct. 3, 2008.

* cited by examiner

SYSTEM AND METHOD FOR EFFICIENTLY PROVIDING HIGH-PERFORMANCE DISPATCH SERVICES IN A WIRELESS SYSTEM

BACKGROUND OF THE INVENTION

1. Field of the Invention

The present invention generally relates to wireless telecommunications, and more specifically, relates to a system and method for efficient dispatch services in communications among multiple communicating devices on a wireless network.

2. Description of the Related Art

Technology advancement has made mobile telephones or wireless communications devices inexpensive and accordingly ubiquitous. As wireless telecommunication devices are manufactured with greater processing ability and storage, they also become more versatile and incorporate many features including direct radio communication capability between two or a group of individual handsets. This direct radio communication capability is commonly known as the push-to-talk (PTT) or "walkie-talkie" feature that allows a user with one handset to communicate with the device of a predefined set of members of a group without dialing a destination telephone number.

In one version of a PTT system, a wireless telecommunication device, such as a handset, uses one single frequency for both upward and downward communications with a remote PTT server, while in a normal wireless communication, a wireless telephone uses two frequencies for communicating with the PTT server, one for outgoing and one for incoming communications. The PTT system requires the person who is speaking to press a PTT button while talking and then release it when done. Any listener in the group can then press their button to respond. In this manner, the system determines which direction the signal travels. In a typical configuration, when a user makes a call to a receiving party or a group of receiving parties using the PTT system, the user's handset first makes a request to a remote server by informing the server it is ready to transmit. The remote PTT server verifies that no other party is using the communication channel and that the channel is available, and then assigns the channel to the user. The user's message is received by the server and the server sends the message to each and every receiving party. After the message is transmitted to every receiving party, the channel is released and ready for use by other parties.

During the process described above, usually there is a brief delay between the time a user presses a PTT button at his handset until the server dispatches a response granting a channel to the wireless device. The delay is caused by the inner working of the wireless device and the interaction between the wireless device and the PTT server. Though short, the delay can be a nuisance as the conversing people are expecting instantaneous communications.

Therefore, it is desirous to have an apparatus and method that enables a server to quickly dispatch a response to the wireless device and the wireless device to quickly establish a PTT communication. It is to such apparatus and method that the present invention is primarily directed.

SUMMARY OF THE INVENTION

The system and method according to the invention enables efficient dispatch of messages between a wireless device and a server. The wireless device remains in a paging state instead of an idling state enabling the wireless device to efficiently communicate with the server.

In one embodiment, a method for providing high performance dispatch services over a wireless communication network is provided. The method includes receiving a first message at a server from a wireless device indicating the first wireless device is ready to transmit a user communication data to the server. The first wireless device has at least a paging state in which the first wireless device is capable of communicating with the server and a transmission state in which the first wireless device is capable of transmitting the user communication data to the server through a first access channel. The first wireless device is in the paging state when the first message is received by the server. The method further includes transmitting a second message from the server to the first wireless device, the second message instructing the first wireless device to transition from the paging state to the transmission state, receiving a third message from the first wireless device at the server indicating the first wireless device is ready to transmit the user communication data to the server through the first access channel, and receiving the user communication data from the first wireless device.

In another embodiment, an apparatus for efficiently transmitting data packets in push-to-talk (PTT) communications to a remote server on a wireless telecommunication network is provided. The apparatus includes a transceiver, a user interface, and a controller. The transceiver transmits data packets to the remote server, the data packets being part of a PTT communication, and the user interface unit receives the PTT communication from a user. The controller maintains an internal state for the apparatus. The apparatus has at least a paging state in which the wireless device is active and not transmitting the data packets to the remote server and a transmission state in which the wireless is capable of transmitting the user communication data to the server through a first access channel. The transceiver transmits a first message to the remote server when the apparatus is the paging state and ready to transmit the data packets. The apparatus transitions from the paging state to the transmission state after receiving a second message from the remote server and transitions from the transmission state to the paging state after the transceiver transmits the data packets on the first access channel to the remote server.

In yet another embodiment, a system for providing high performance dispatch services over a wireless communication network is provided. The system includes a server and a user device. The server is in communication with the wireless communication network and selectively transmitting to the user device a plurality of messages. The user device is capable of communicating with the server through the wireless communications network. The user device has at least a paging state in which the user device is capable of communicating with the server and a transmission state in which the user device is capable of transmitting the user communication data to the server through a first access channel. The user device is capable of transmitting in the paging state a first message to the server informing the server it is ready to transmit a user communication to the server, receiving a second message from the server and transitioning to a transmission state, and transmitting the user communication to the server through a first access channel the user communication to the server.

The present system and methods are therefore advantageous as they enable a wireless communication device to efficiently transmit data packets to a server during a PTT communication. Any delay in ongoing PTT communications is therefore minimized. Other advantages and features of the present invention will become apparent after review of the hereinafter set forth Brief Description of the Drawings, Detailed Description of the Invention, and the Claims.

DETAILED DESCRIPTION OF THE INVENTION

In this description, the terms "communication device," "wireless device," "wireless communications device," "PTT communication device," "handheld device," and "handset" are used interchangeably, and the terms "channels" and "groups" are used interchangeably. The term "application" as used herein is intended to encompass executable and nonexecutable software files, raw data, aggregated data, patches, and other code segments. Further, like numerals refer to like elements throughout the several views, and the articles "a" and "the" includes plural references, unless otherwise specified in the description.

Figure 1:
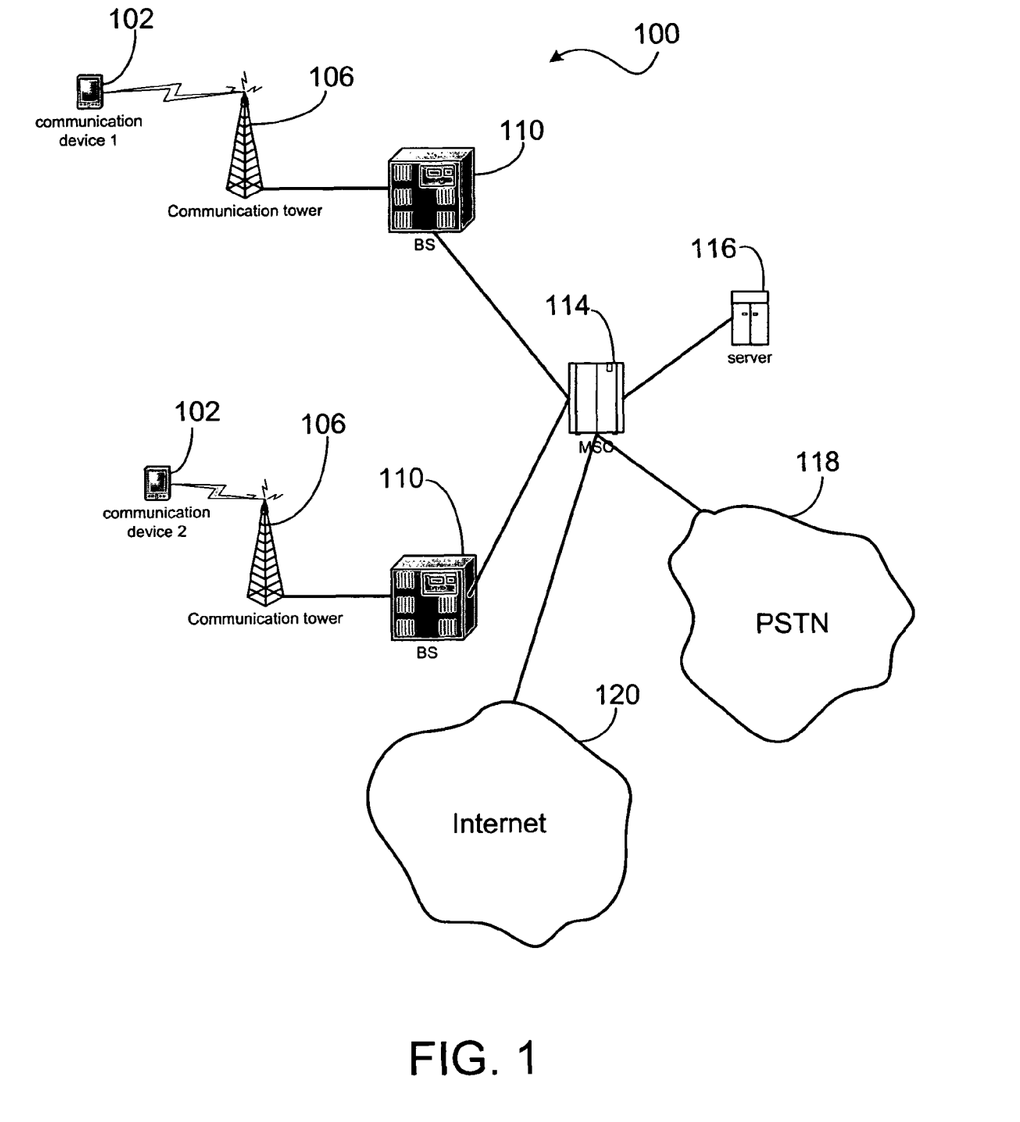
FIG. 1 depicts one embodiment of a telecommunication network implementing the system with high-performance dispatch services.

In overview, the system and method according to the invention provide high performance dispatch services for a push-to-talk (PTT) communication over a wireless communication network. When a wireless device is powered up, it registers with a server and then transitions to a paging state instead of an idle state. When the wireless device is ready to transmit PTT communications, it sends a message to the server and transitions to a transmission state when a confirmation is received from the server. Once in the transmission state, the wireless device is ready to transmit the PTT communications to the server. FIG. 1 depicts a communication network 100 that can be with a wireless device having state transitions. The communication network 100 includes one or more communication towers 106, each connected to a base station (BS) 110 and serving users with communication device 102. The communication device 102 can be a cellular telephone, pager, personal digital assistant (PDA), laptop computer, or other hand-held, stationary, or portable communication device that supports push-to-talk (PTT) communications. The commands and data input by each user are transmitted as digital data to a communication tower 106. The communication between a user using a communication device 102 and the communication tower 106 can be based on different technologies, such code division multiple access (CDMA), time division multiple access (TDMA), frequency division multiple access (FDMA), the global system for mobile communications (GSM), or other protocols that may be used in a wireless communications network or a data communications network.

The PTT communications are transmitted through data packets over the communication network 100. The wireless communication device 102 sends and receives audio data packets on an assigned communication channel and control data are sent and received through a data channel. The data packets from each device is sent from the communication tower 106 to a base station (BS) 110, and forwarded to a mobile switching center (MSC) 114, which may be connected to a public switched telephone network (PSTN) 118 and the Internet 120. The MSC 114 may be connected to a server 116 that supports the PTT feature in the communications network 100. Optionally, the server 116 may be part of the MSC 114. The server 116 may also suppress transmission of PTT communication to a particular wireless device upon request from that device. The data packets are forwarded by the server 116 to the receiving wireless device 102 where an audio stream will be constructed based on the data in the data packets. In an alternative embodiment (not shown), the MSC 114 may not needed in a data-only network. The data packets are sent by the BS 110 to a packet data serving node and/or other servers for processing. The data packets are transmitted between the wireless device 102 and the BS 106 according to a predefined protocol such as Real-time Transport Protocol (RTP), TCP/IP, or other suitable protocols. The wireless device 102, after powering up and registering with the server 116, transitions to a paging state and waits for the user to activate the PTT communication feature.

Figure 2:
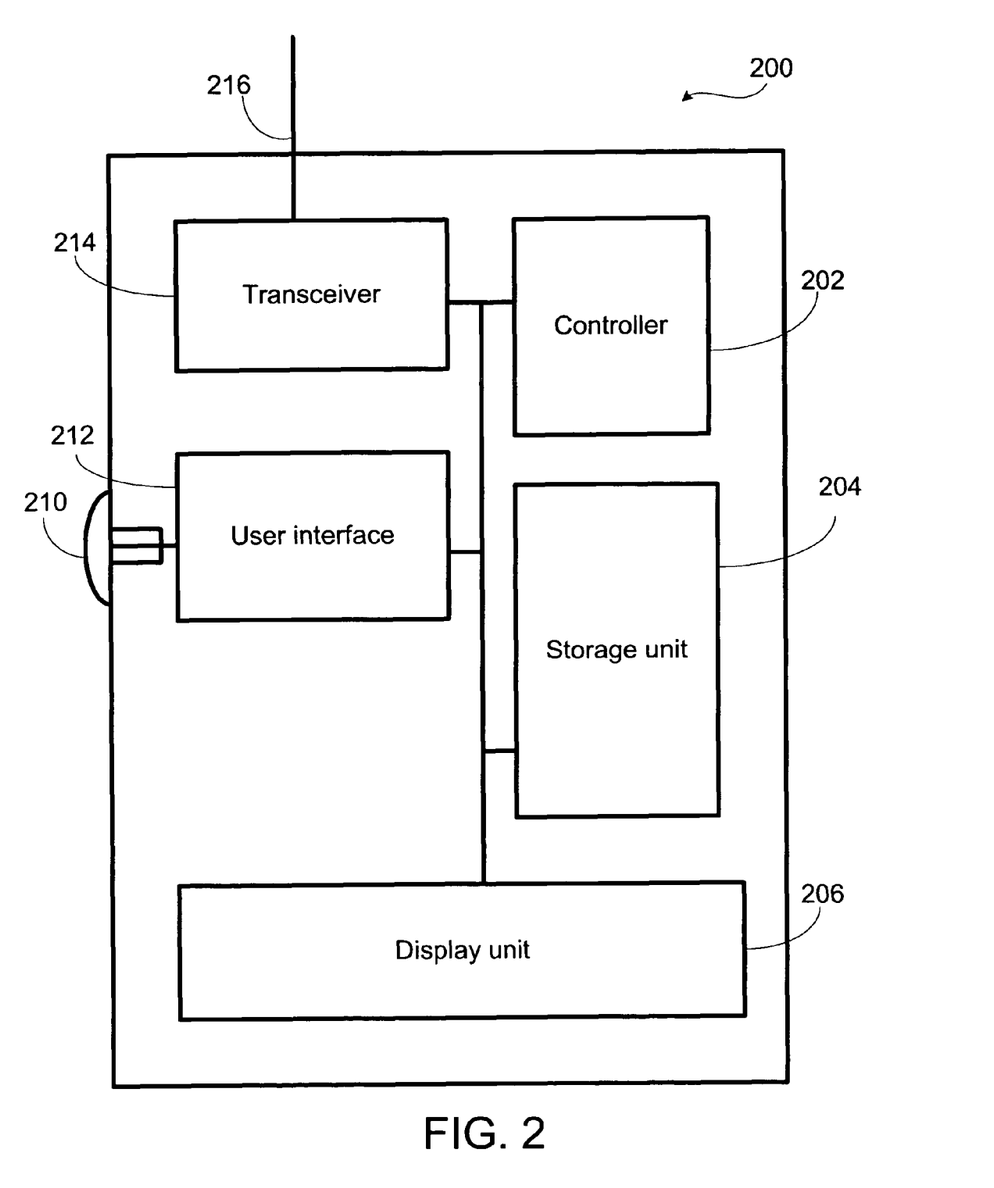
FIG. 2 illustrates a block diagram of one embodiment of a wireless handset.

FIG. 2 illustrates a block diagram 200 of a wireless handset 102. The wireless handset 102 includes a controller 202, a storage unit 204, a display unit 206, a user interface unit 212, a push-to-talk activation unit 210, a transceiver 214, and an antenna 216. The controller 202 can be hardware, software, or a combination thereof. The controller 202 is capable of controlling and maintaining an internal state for the wireless handset 102. The display unit 206 may display graphical images or information about an incoming PTT communication to the user. The user interface unit 212 controls hardware, such as speaker, microphone, display unit 206, keypad and push-to-talk activation unit 210 used for communication with the user. The transceiver 214 transmits and receives radio signals to and from the communication tower 106, where the radio signals include command signaling and the data packets. The controller 202 also interprets commands and data received from the user and the communication network 100. The storage unit 204 stores information about the PTT communications and the internal states of the wireless handset 102.

Figure 3:
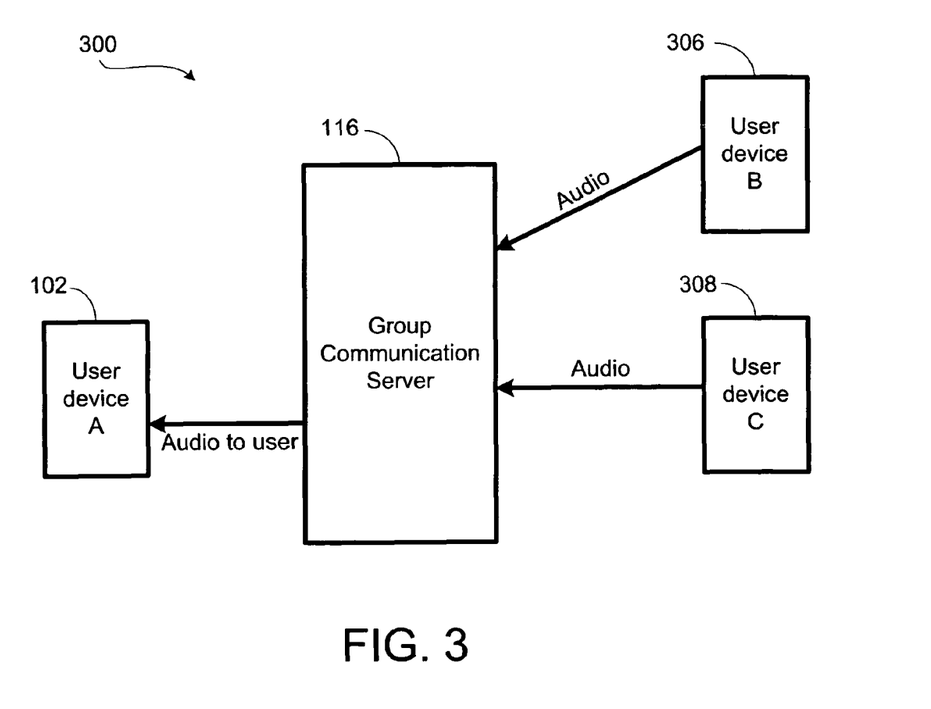
FIG. 3 is a diagram representing interactions between the server and wireless devices during a PTT communication process.

FIG. 3 is a diagram 300 representing interactions between the server (also known as group communication server) 116 and wireless devices 102, 306, 308 during a PTT communication process. A communication does not occur between an initiating wireless device 102 and a server 116 until a user activates a PTT button. Generally, the user may start a PTT communication with members of a selected PTT group by activating the PTT feature. The wireless device 102 in a paging state sends a message through a control channel to the server 116 indicating it is ready to transmit a PTT communication. Upon receiving the message from the wireless device 102, the server 116 sends a confirmation message to the wireless device 102. The wireless device 102 then sends an acknowledgement message to the server 116 and transitions to a new transmission state in which it is possible for the wireless device 102 to transmit data. A PTT communication channel is granted by the server 116 to the initiating wireless device 102, and the initiating wireless device 102 can transmit audio communication to the selected PTT group 314 through the server 116. Upon receiving the user audio communication, the server 116 identifies the members 306-308 of the PTT communication group that the initiating user device 102 wants to send the audio communication. The server 116 then forwards the audio communication to each member 306-308 of the PTT communication group. It should be noted that data other than audio communication can also be sent in a PTT communication, such as video and/or multimedia data.

Figure 4:
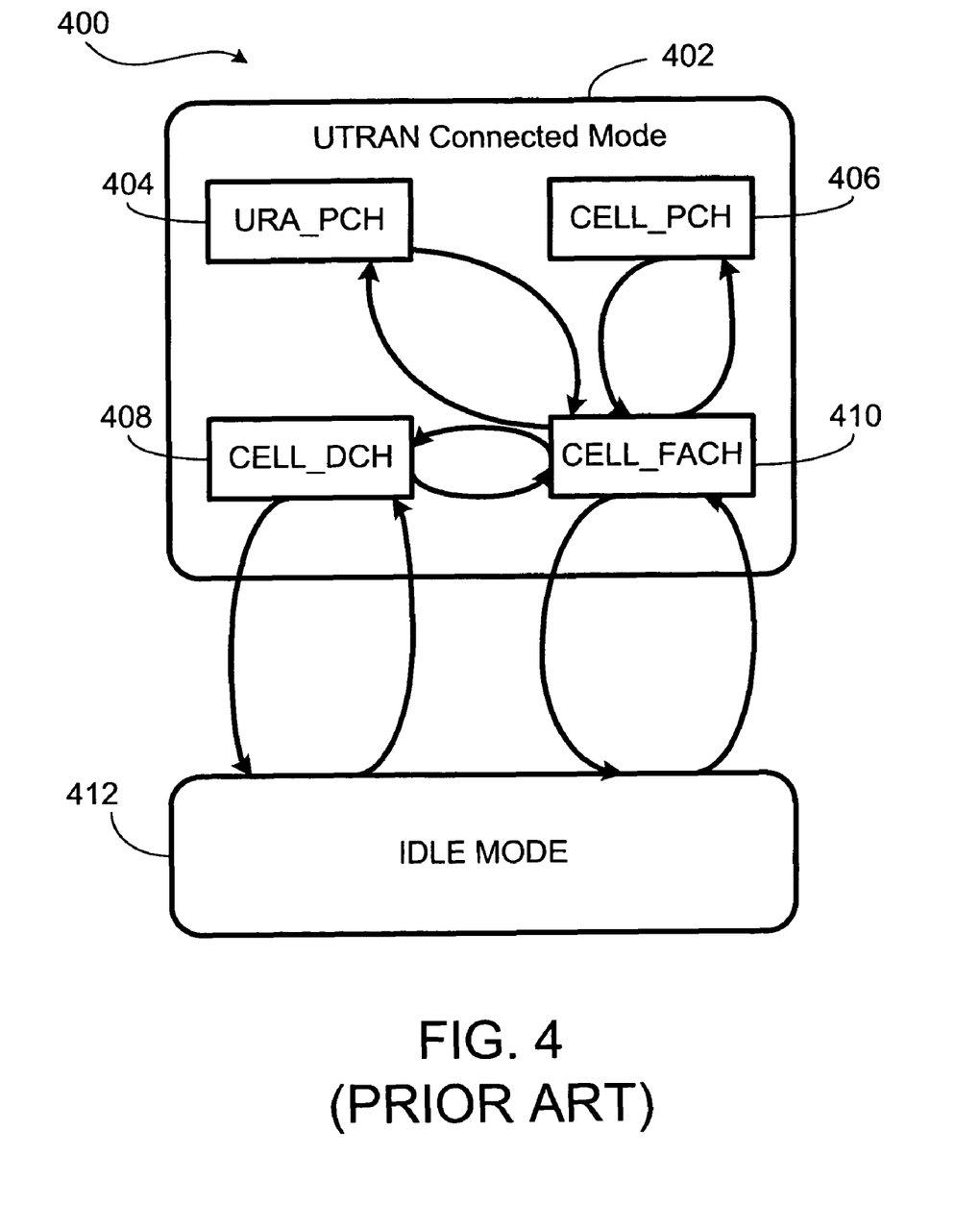
FIG. 4 is a prior art schematic diagram depicting internal state transitions of a wireless device.

The wireless device 102 has a plurality of internal states and it transitions through them when it is powered up. FIG. 4 is an illustration of a prior art state transition diagram 400 for a wireless device 102. After powered up, when the wireless device 102 is not handling any user operation, the wireless device 102 is usually in the idle mode 412. In the idle mode, the wireless device 102 may be camped on a network cell, such as a Universal Terrestrial Radio Access Network (UTRAN) cell or a Global System for Mobile Communications (GSM) cell, and receiving messages from the network (server) on a paging channel.

If the server 116 wants to deliver a PTT communication to the wireless device 102, it must first page the wireless device 102 during the wireless assigned paging cycle. The wireless device 102 responds to the page by requesting a Radio Resource Control (RRC) connection transmitting on a Random Access Channel (RACH). If the wireless device 102 wants to set up a PTT communication, it autonomously requests an RRC connection by transmitting it on the RACH. After establishing a RRC connection with the network, the wireless device 102 transitions to a UTRAN Connected Mode 402. In the UTRAN Connected Mode, the signaling messages are exchanged with the network. The wireless device 102 may also transition to other modes, such as GSM Connected Mode or General Packet Radio Service (GPRS) packet transfer mode (not shown), if other connection signals are received.

The wireless device 102 may enter CELL_DCH state 408 from the idle mode 412 when an RRC connection is established or a dedicated physical channel is established from the CELL_FACH state 410. The wireless device 102 may enter CELL_FACH state 410 from the idle mode 412 when an RRC connection is established or from the CELL_DCH state when directed by the network to release a dedicated physical channel. The wireless device 102 may also enter the CELL_FACH state 410 from URA_PCH state 404 or CELL_PCH state 408 when the wireless device 102 has the need to transmit signaling or user data from these states. The wireless device 102 enters the CELL_PCH state 406 from either the CELL_DCH state 408 or the CELL_FACH state 410 when the network detects a lack of activity from the wireless device 102. While in the CELL_PCH state 406, the wireless device 102 can monitor the paging channel. The URA_PCH state 404 is similar to the CELL_PCH state 406, except for procedures to update network related information.

In the prior art, the wireless device 102 in the communication network depicted in FIGS. 1 and 3, after powering up and registering with the server 116, usually enters into the idle mode 412 in which it may receive messages from the server 116 on a paging channel, but does not transmit back to the server 116. The signaling 507 illustrated in FIG. 5 usually occurs if the wireless device 102 wants to set up a call or a PTT communication. After detecting that the user wants to make a PTT communication, the wireless device 102 in the CELL_IDLE state sends a connection request message 508 to the server 116 requesting a RRC connection. The server 116 responds by sending a connection setup message 510 to the wireless device 102. After receiving the connection setup message 510, the wireless device 102 establishes a RRC connection, transitions to the CELL_FACH state 410, and sends a completion message 512 back to the server 116. The wireless device 102 proceeds sending a measurement report message 514 to the server 116. The measurement report generally relates to the size of data to transfer from the wireless device 102 to the server 116. If the server 116 detects a lack of activity from the wireless device 102, it sends a radio bearer release message 516 to the wireless device 102, and the wireless device 102 transitions to the CELL_PCH state 406 and sends back a completion message 518. When the data becomes available, the wireless device 102 notifies the server 116 and then moves to a state where it can transfer the data to the server 116 (not shown).

Figure 5:
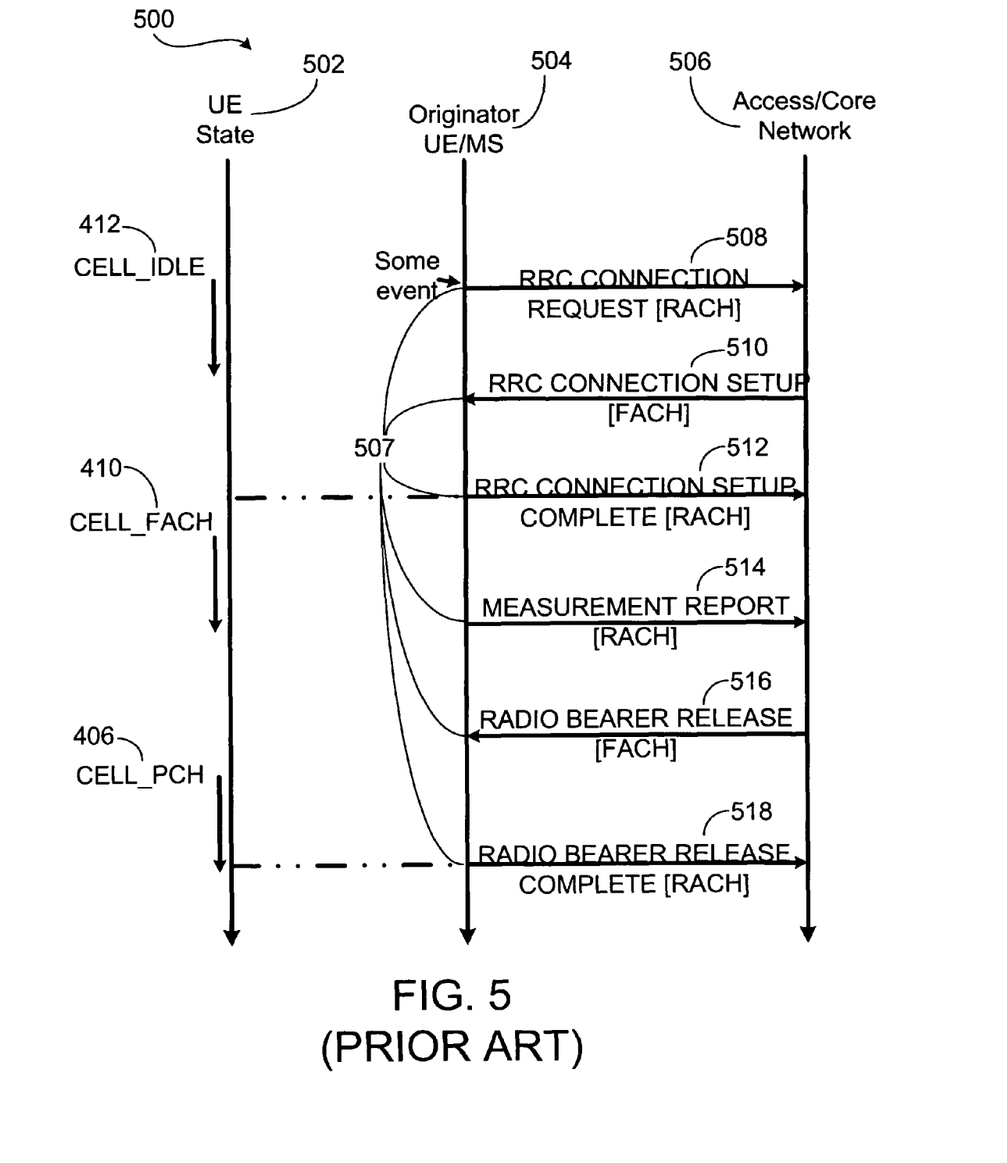
FIG. 5 is a prior art diagram depicting state transitions and corresponding signaling between a wireless device and a network server.

The state transitions and signaling illustrated in FIG. 5 generally cause a noticeable delay to the user and make dispatching of resources inefficient. The delay can be eliminated and dispatching of resources made efficient according to methods of the present invention.

Figure 6:
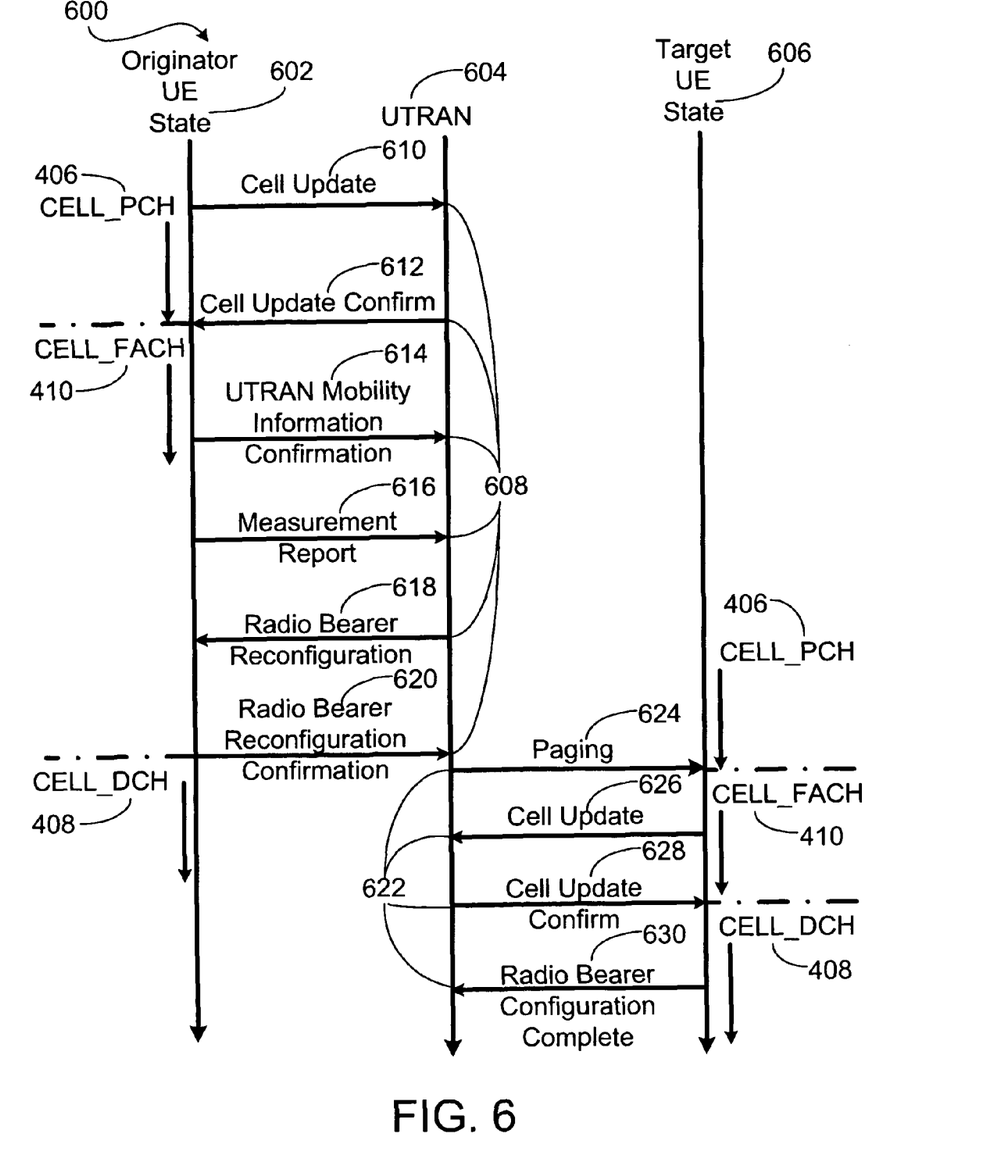
FIG. 6 is a diagram depicting state transitions and corresponding signaling between a wireless device and a network server according to the present invention.

FIG. 6 illustrates state transitions and signaling for an efficient dispatching of resources according to the present invention. A wireless device 102 in the communication network depicted in FIG. 1, after powering up and registering with the server 116, enters in a paging state, the CELL_PCH state 608, instead of the idle state. In the CELL_PCH state 608, the wireless device 102 is able to provide fast response to the server 116 by monitoring the paging channel.

When the wireless device 102 has data to send to the server 116, it sends a Cell Update message 610 to the server 116, which responds by sending a confirmation message 612 back to the wireless device 102. When the confirmation message 612 is received, the wireless device 102 sends a mobility information message 614 to confirm the receipt of the confirmation message 612 to the server 116 and transitions to the CELL_FACH state 410 in which data transmission is possible on the RACH. The wireless device 102 can transmit data to the server 116 in this state; however, if the amount of data is above a configured threshold for the RACH, the wireless device 102 may need to move to a different state. If the amount the data is larger than the configured threshold for the RACH, the wireless device 102 sends a measure report message 616 to the server 116. After receiving the measurement report message 616, the server 116 can assign a Dedicated Channel (DCH), also known as Reverse DCH (RDCH) to the wireless device 102. The server 116 sends a radio bearer reconfiguration message 618 to the wireless device 102. The wireless device 102 transitions to the CELL_DCH state 408 after receiving the reconfiguration message 618 and sends a confirmation message 620 back to the server 116. At this time, the wireless device 102 can start to transmit the data on this DCH. After transmitting the data, the wireless device 102 returns to the CELL_PCH state and continues to monitor the paging channel.

When the server 116 sends a paging message 624 on the paging channel to all the targeted wireless devices. A targeted wireless device is in the CELL_PCH state 406 while inactive and transitions to the CELL_FACH state 410 after receiving the paging message 624. The targeted wireless device sends a cell update message 626 back to the server 116, which in turn sends a confirmation message 628 to the targeted wireless device. Since the server 116 already knows what resources are needed, it assigns them with the confirmation message 628. The targeted wireless device then transitions to the CELL_DCH state 408 and sends back a configuration complete message 630 to the server 116. After the targeted wireless device is reconfigured to receive data on a DCH, the server 116 starts to transmit the data on that DCH. When the data transmission is done, the targeted wireless device transitions back to the CELL_PCH state 406.

Figure 7:
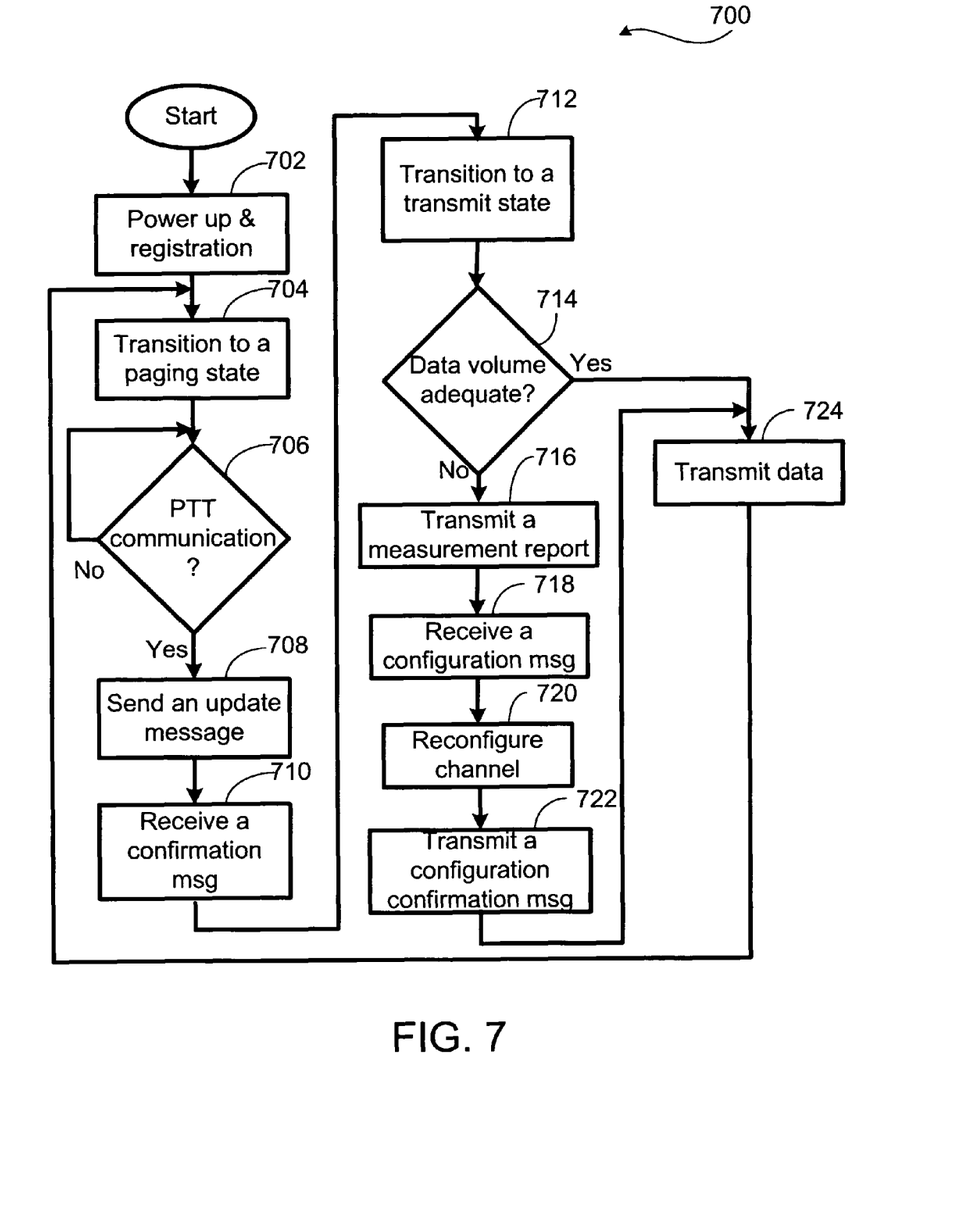
FIG. 7 is a flow chart illustrating one embodiment of a data transmission process for a wireless device.

FIG. 7 is a flow chart 700 illustrating a transmitting wireless device process. The wireless device 102 powers up and registers with the server 116, step 702. After registering with the server 116, the wireless device 102 transitions to a paging state, step 704, where it monitors a paging channel. When the wireless device 102 detects that a user has activated the PTT feature, it sends an update message to the server 116, step 708, informing the server 116 that it is ready to transmit data to the server 116. After receiving a confirmation message from the server 116, step 710, the wireless device 102 transitions to a transmission state, step 712. If the volume of the data does not exceed the threshold for the assigned channel, the wireless device 102 starts to transmit the data on the assigned channel, step 724. After transmitting the data, the wireless device 102 goes back to the paging state, step 704.

If the data volume exceeds the threshold for the assigned channel, the wireless device 102 sends a measurement report message to the server 116, step 716, and waits for instructions from the server 116. After receiving a configuration message, step 718, the wireless device 102 reconfigures to a new channel, step 720, sends a confirmation message to the server 116, step 722, and starts to transmit data on the new channel, step 724. As stated above, after transmitting the data, the wireless device 102 transitions back to the paging state.

Figure 8:
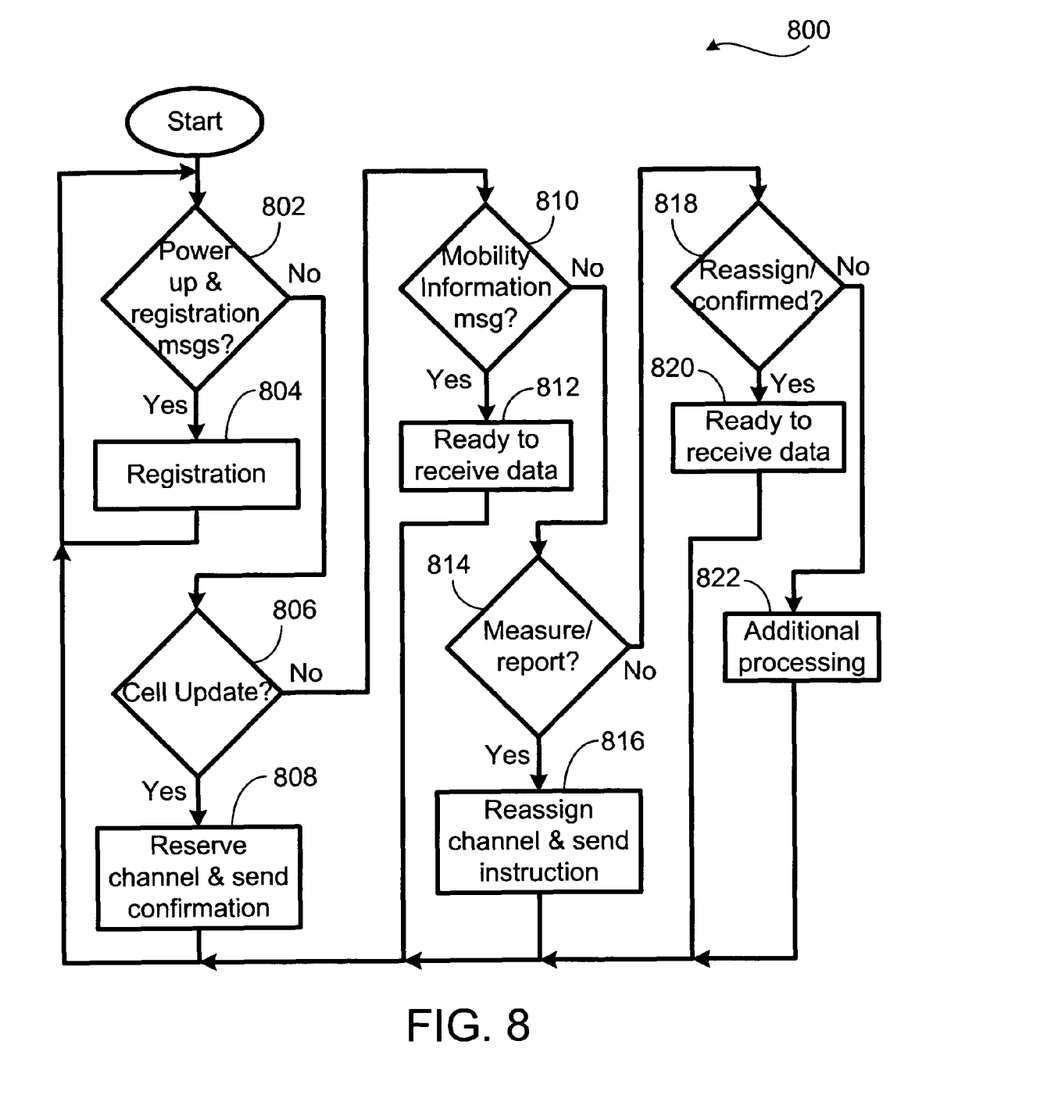
FIG. 8 is a flow chart illustrating one embodiment of a messaging process for a server.

FIG. 8 is a server process 800 of the invention. When the server 116 receives a message from a wireless device 102, it checks whether it is a registration message sent during the power up procedure, step 802. If it is a registration message, the server 116 proceeds to register the wireless device 102, step 804. If it is a cell update message indicating the wireless device is ready to upload data, step 806, the server 116 goes through the process to reserve a channel and send a confirmation message to the wireless device, step 808. If the message is a mobility information message, step 810, the server 116 readies itself to receive data from the wireless device 102, step 812. If the message is a measurement report indicating a need for a different channel, step 814, the server 116 assigns a new channel and sends instructions to the wireless device 102 to use the new channel, step 816. If it is a message confirming the reassignment, step 818, the server 116 readies itself to receive the data on the new channel, step 820. Besides the above described messages, the server 116 also checks for other messages and performs appropriate processing, step 822.

Figure 9:
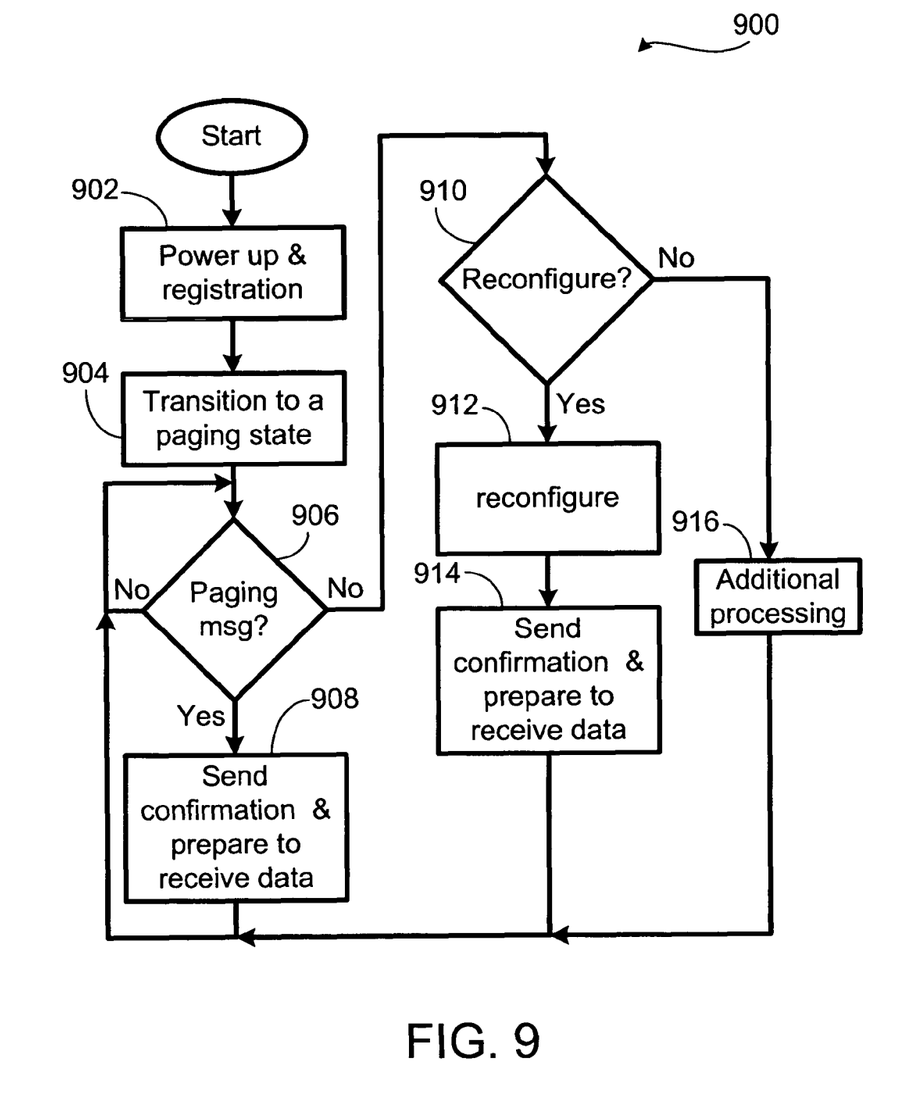
FIG. 9 is a flow chart illustrating one embodiment of a message receiving process for a wireless device.

FIG. 9 depicts a process 900 for a targeted wireless device according to the invention. The targeted wireless device powers up and goes through the registration procedure, step 902. After registering with the server 116, the targeted wireless device transitions to a paging state, step 904, and monitors the paging channel, step 906. If a paging message is received, the targeted wireless device sends a confirmation message to the server 116 and starts the process to receive data, step 908. If the message received is a reconfiguration message, or includes a reconfiguration instruction, step 910, the targeted wireless device reconfigures itself by moving it to a designated channel, step 912, sends a confirmation message back to the server 116, and starts the process to received data, step 914. If the message is of another type, the targeted wireless device acts accordingly and takes additional processes, step 916.

In view of the method being executable on a wireless service provider's computer device or a wireless communications device, the method can be performed by a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of FIGS. 6-9, the steps illustrated do not require or imply any particular order of actions. The actions may be executed in sequence or in parallel. The method may be implemented, for example, by operating portion(s) of the wireless network, such as a wireless communications device or the server, to execute a sequence of machine-readable instructions. The instructions can reside in various types of data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media.

While the invention has been particularly shown and described with reference to a preferred embodiment thereof, it will be understood by those skilled in the art that various changes in form and detail may be made without departing from the spirit and scope of the present invention as set forth in the following claims. For example, the description above employs the terminology commonly used in the Universal Mobile Telecom System (UMTS), and it is should be understood that the apparatus, system, and method can be easily modified to support other type of systems and protocols, and the like. Furthermore, although elements of the invention may be described or claimed in the singular, the plural is contemplated unless limitation to the singular is explicitly stated.

What is claimed is:

1. A method for providing high performance dispatch services over a wireless communication network, comprising the steps of:

receiving a first message at a server from a first wireless device indicating the first wireless device is ready to transmit user communication data to the server, the first wireless device having at least a paging state in which the first wireless device is capable of communicating with the server and a transmission state in which the first wireless device is capable of transmitting the user communication data to the server through a first access channel, the first wireless device being in the paging state when the first message is received by the server;

transmitting a second message from the server to the first wireless device, the second message instructing the first wireless device to transition from the paging state to the transmission state;

receiving a third message from the first wireless device at the server indicating the first wireless device is ready to transmit the user communication data to the server through the first access channel; and receiving the user communication data from the first wireless device;

wherein said first wireless device transitions to said paging state instead of an idle state upon powering up and registering with the server.

2. The method of claim 1, further comprising the steps of:
receiving a measurement message from the first wireless device at the server indicating an amount of user communication data; and
transmitting a configuration message from the server to the first wireless device instructing the wireless device to transmit the user configuration data through a second access channel.

3. The method of claim 2, further comprising the step of receiving a reconfiguration confirmation message from the first wireless device after the wireless device transitions from the transmission state to a dedicated channel state.

4. The method of claim 1, wherein the first message is a CELL_UPDATE message.

5. The method of claim 1, wherein the third message is a mobility information confirmation message.

6. The method of claim 1, wherein communications between the server and the first wireless device follow the protocols for the Universal Mobile Telecom System.

7. The method of claim 1, wherein the second message is a CELL_UPDATE_CONFIRM message.

8. The method of claim 1, further comprising the step of transmitting a fourth message to from the server to the first wireless device instructing the wireless device to transition to the paging state after the first wireless device finishes transmitting the user communication data to the server.

9. The method of claim 1, further comprising the step of transmitting a paging message from the server to a second wireless device, the second wireless device being in the paging state.

10. The method of claim 9, further comprising the step of receiving an update message from the second wireless device at the server, the second wireless device transitioning to the transmission state.

11. An apparatus for efficiently transmitting data packets in push-to-talk (PTT) communications to a remote server on a wireless telecommunication network, comprising:
a transceiver for transmitting data packets to the remote server, the data packets being part of a PTT communication;
a user interface unit for receiving the PTT communication from a user; and
a controller for maintaining an internal state for the apparatus, the apparatus having at least a paging state in which the apparatus is active and not transmitting the data packets to the remote server and a transmission state in which the apparatus is capable of transmitting the data packets to the remote server through a first access channel,
wherein the apparatus transitions to said paging state instead of an idle state upon powering up and registering with the remote server, and the transceiver transmits a first message to the remote server when the apparatus is in the paging state and ready to transmit the data packets, the apparatus transitions from the paging state to the transmission state after receiving a second message from the remote server, and the apparatus transitions from the transmission state to the paging state after the transceiver transmits the data packets on the first access channel to the remote server.

12. The apparatus of claim 11, wherein the transmitter further transmits a measurement message to the remote server and the transmitter transmits the data packets from a second access channel after receiving a configuration message from the remote server.

13. An apparatus for efficiently transmitting data packets in push-to-talk (PTT) communications to a remote server on a wireless telecommunication network, comprising:
means for transmitting data packets to the remote server, the data packets being part of a PTT communication;
means for receiving the PTT communication from a user; and
means for maintaining an internal state for the apparatus, the apparatus having at least a paging state in which the apparatus is active and not transmitting the data packets to the remote server and a transmission state in which the apparatus is capable of transmitting the data packets to the remote server through a first access channel,
wherein the apparatus transitions to said paging state instead of an idle state upon powering up and registering with the remote server, and the means for transmitting transmits a first message to the remote server when the apparatus is in the paging state and ready to transmit the data packets, the apparatus transitions from the paging state to the transmission state after receiving a second message from the remote server, and the apparatus transitions from the transmission state to the paging state after the means for transmitting transmits the data packets on the first access channel to the remote server.

14. The apparatus of claim 13, wherein the means for transmitting data packets further transmits a measurement message to the remote server and the means for transmitting data packets transmits the data packets from a second access channel after receiving a configuration message from the remote server.

15. A computer-readable medium on which is stored a computer program for providing high performance dispatch services over a wireless communication network, the computer program comprising computer instructions that when executed by a computer performs the steps of:
receiving a first message at a server from a first wireless device indicating the first wireless device is ready to transmit user communication data to the server, the first wireless device having at least a paging state in which the first wireless device is capable of communicating with the server and a transmission state in which the first wireless device is capable of transmitting the user communication data to the server through a first access channel, the first wireless device transitioning to said paging state instead of an idle state upon powering up and registering with the server and being in the paging state when the first message is received by the server;
transmitting a second message from the server to the first wireless device, the second message instructing the first wireless device to transition from the paging state to the transmission state;
receiving a third message from the first wireless device at the server indicating the first wireless device is ready to transmit the user communication data to the server through the first access channel; and
receiving the user communication data from the first wireless device.

16. The computer-readable medium of claim 15 said computer instructions when executed, further performs the steps of:
receiving a measurement message from the first wireless device at the server indicating an amount of user communication data; and
transmitting a configuration message from the server to the first wireless device instructing the first wireless device to transmit the user configuration data through a second access channel.

17. The computer-readable medium of claim 15, said computer instructions further comprising the step of receiving a reconfiguration confirmation message from the first wireless device after the first wireless device transitions from the transmission state to a dedicated channel state.

18. The computer-readable medium of claim 15, said computer instructions further comprising the step of transmitting a fourth message to from the server to the first wireless device instructing the first wireless device to transition to the paging state after the first wireless device finishes transmitting the user communication data to the server.

19. The computer-readable medium of claim 15, said computer instructions further comprising the step of transmitting a paging message from the server to a second wireless device, the second wireless device being in the paging state.

20. The computer-readable medium of claim 19, said computer instructions further comprising the step of receiving an update message from the second wireless device at the server, the second wireless device transitioning to the transmission state.

21. A system for providing high performance dispatch services over a wireless communication network, comprising:
- a server in communication with the wireless communication network, the server selectively transmitting to a user device a plurality of messages;
- a user device capable of communicating with the server through the wireless communications network, the user device having at least a paging state in which the user device is capable of communicating with the server and a transmission state in which the user device is capable of transmitting the user communication data to the server through a first access channel, the user device being capable of:
  - transmitting in the paging state a first message to the server informing the server it is ready to transmit a user communication to the server,
  - receiving a second message from the server and transitioning to a transmission state, and
  - transmitting the user communication to the server through the first access channel;
- wherein said user device transitions to said paging state instead of an idle state upon powering up and registering with the server.

22. The system of claim 21, wherein the user device further being capable of:
- transmitting a measurement message to the server,
- receiving a configuration message from the server, and
- transmitting the user communication to the server through a second access channel.

23. A method for providing high performance dispatch services over a wireless communication network, comprising:
- a step for receiving a first message at a server from a first wireless device indicating the first wireless device is ready to transmit user communication data to the server, the first wireless device having at least a paging state in which the first wireless device is capable of communicating with the server and a transmission state in which the first wireless device is capable of transmitting the user communication data to the server through a first access channel, the first wireless device transitioning to the paging state instead of an idle state upon powering up and registering with the server, the first wireless device being in the paging state when the first message is received by the server;
- a step for transmitting a second message from the server to the first wireless device, the second message instructing the first wireless device to transition from the paging state to the transmission state;
- a step for receiving a third message from the first wireless device at the server indicating the first wireless device is ready to transmit the user communication data to the server through the first access channel; and
- a step for receiving the user communication data from the first wireless device.

* * * * *